United States Patent
Lafon

[11] 3,855,249
[45] Dec. 17, 1974

[54] 4-PHENOXY-3-HYDROXY-BUTYRAMIDINE DERIVATIVES

[75] Inventor: Louis Lafon, Paris, France

[73] Assignee: Societe anonyme dite: Orsymonde, Paris, France

[22] Filed: Aug. 9, 1972

[21] Appl. No.: 278,944

[30] Foreign Application Priority Data
Aug. 13, 1971  France .............................. 71.29685

[52] U.S. Cl. ...... 260/343.7, 260/453 R, 260/465 F, 260/501.11, 260/501.12, 260/501.14, 260/564 G, 260/564 R, 424/326
[51] Int. Cl.................................................. C07d 5/12
[58] Field of Search...... 260/564 G, 501.14, 501.11, 260/501.12, 343.7

[56] References Cited
UNITED STATES PATENTS
3,334,137   8/1967   Bruderlein ..................... 260/564 G
3,394,181   7/1968   Bell .............................. 260/564 G

*Primary Examiner*—Leon Zitver
*Assistant Examiner*—Gerald A. Schwartz

[57] ABSTRACT

The compounds of the formula:

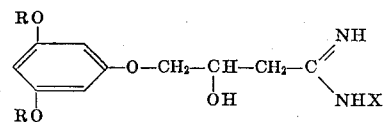

in which R is hydrogen atom or $C_1$-$C_5$ alkyl and X is hydrogen or OH and their acid addition salts are useful in therapy, e.g., as anti-arrhythmia agents.

3 Claims, No Drawings

4-PHENOXY-3-HYDROXY-BUTYRAMIDINE DERIVATIVES

The present invention relates to 4-phenoxy-3-hydroxy-butyramidine derivatives, to a process for their preparation, and to their application in therapy.

The derivatives of the invention, which are new compounds, are those of the formula:

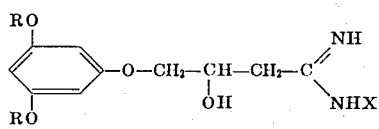

in which R represents hydrogen or alkyl of one to five carbon atoms and X represents hydrogen or hydroxyl, and their acid addition salts, i.e., salts of pharmaceutically acceptable acids.

The acid addition salts may be obtained by condensing the compounds of formula I with inorganic and organic acids. Suitable inorganic acids are those which give non-toxic salts, especially hydrochloric, hydrobromic, sulphuric or phosphoric acid. Suitable organic acids which give non-toxic salts, are oxalic, fumaric, maleic, glutamic, cyclohexylsulphamic, aspartic, malic, benzoic and ascorbic acids.

A compound of formula I in which X=H, may be made by:

a. reacting epichlorohydrin in stoichiometric amount, with a 3,5-dialkoxy-phenol of formula:

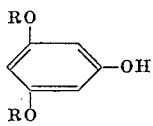

wherein R is defined as above;

b. treating the epoxide derivative thus obtained, in a medium such as ether, with hydrogen chloride;

c. reacting the 1-chloro-2-hydroxy-propyl derivative obtained of the formula

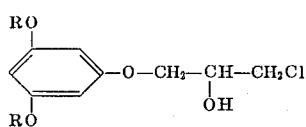

with an alkali metal cyanide, especially potassium cyanide;

d. treating the nitrile thus obtained with hydrogen chloride and ethanol, preferably in an ether medium; and e. treating the imino-ethyl-ether thus formed with a stream of ammonia gas.

To prepare a compound of formula I in which X=OH, hydroxylamine is reacted, by a method which is known in itself, with a 4-(3,5-dialkoxy-phenoxy)-3-hydroxy-butyramidine (X=H) obtained in stage (e) of the aforesaid process. Preferably, the reaction for producing the amidoxime derivative (X=OH) is carried out at a temperature of between 10° to 30°C, preferably between 15° and 25°C, by bringing 4.5 mols of 4-(3,5-dialkoxy-phenoxy)-3-hydroxy-butyramidine hydrochloride into contact, for about 24 hours, with the product of the reaction of 6 mols of an alkali metal alcoholate with 6 mols of hydroxylamine hydrochloride. The alkali metal alcoholates advantageously used are sodium methylate and sodium ethylate.

The therapeutic compositions of the invention contain at least one compound of the formula I or a non-toxic acid addition salt thereof, with a physiologically tolerated vehicle.

The following Examples illustrate the invention.

EXAMPLE 1

4-(3,5-Dimethoxy-phenoxy)-3-hydroxy-butyramidine hydrochloride 7.4 g (0.08 mol) of epichlorohydrin and 25 ml of methanol are added to a solution of 12.3 g (0.08 mol) of 3,5-dimethoxy-phenol and 3.2 g (0.08 mol) of sodium hydroxide in 25 ml of water. The mixture is heated at the boil for 5 minutes. After evaporating the methanol and cooling, the 3-(3,5-dimethoxy-phenoxy)-1,2-epoxy-propane which has formed is extracted with ethyl ether. This ether solution is washed with water, dried over anhydrous sodium sulphate, and saturated with a stream of dry gaseous hydrogen chloride. After standing for 4 days, it is washed with water, with a dilute solution of sodium carbonate, and then again with water. After drying over sodium sulphate and evaporating the ethyl ether, 17.5 g of crude 3-(3,5-dimethoxy-phenoxy)-1-chloro-2-propanol are obtained.

A solution of 5.25 g of potassium cyanide in 20 ml of water is added to this product dissolved in 80 ml of ethanol. The mixture is heated until the solvent boils under reflux, for 1 hour. After evaporating the solvent in vacuo and cooling, ethyl ether is added. 16.4 g of crude 4-(3,5-dimethoxy-phenoxy)-3-hydroxy-butyronitrile can be obtained from the ether solution after it has been washed with water, dried over anhydrous sodium sulphate, and evaporated.

A solution of this product (0.07 mol) in 16 ml of ethanol and 100 ml of ethyl ether is saturated, when cold, with a stream of dry gaseous hydrogen chloride. The mixture is then placed in a refrigerator overnight. Ethyl ether is added and the 4-(3,5-dimethoxy-phenoxy)-3-hydroxy-butyro-imino-ethyl-ether hydrochloride formed is collected by filtration.

A solution of this product in 30 ml of ethanol is saturated with a stream of dry gaseous ammonia. After one night in a refrigerator, the solvent is evaporated in vacuo. The residue is treated with ethyl ether and filtered off. Crude 4-(3,5-dimethoxy-phenoxy)-3-hydroxy-butyramidine hydrochloride, thus isolated, is purified by crystallisation from a mixture of ethanol and ethyl ether. The product, obtained in an overall yield of 30 percent, is a white crystalline powder, the instantaneous melting point of which is 148°C; it is soluble in water, ethanol and methanol, and insoluble in ether and ethyl acetate.

EXAMPLE 2

4-(3,5-Dimethoxy-phenoxy)-3-hydroxy-butyramidoxime hydrochloride

A solution of 3.25 g (0.06 mol) of sodium methylate in 100 ml of methanol is added to a cold solution of 4.2 g (0.06 mol) of hydroxylamine hydrochloride in 100 ml of methanol; the mixture is stirred for 1/2 an hour and filtered; 13 g (0.045 mol) of 4-(3,5-dimethoxy-phenoxy)-3-hydroxy-butyramidine hydrochloride are added to the filtrate. The mixture is left to stand for 24 hours at ambient temperature and then evaporated to dryness in vacuo; the residue is taken up in water and extracted with ethyl acetate; the latter solution is washed with water and dried, and the solvent is driven off in vacuo. 10.4 g (86%) of base, which melts at 90°–92°C, are obtained.

A solution of the base in acetone is acidified with a solution of hydrogen chloride in diethyl ether. The solid is filtered off and recrystallised from a mixture of ethanol and diethyl ether. 4-(3,5-Dimethoxy-phenoxy)-3-hydroxybutyramidoxime hydrochloride is obtained, in a yield of 67 percent as white crystals, m.p. 138°C. It is soluble in water, methanol and ethanol and insoluble in acetone, ethyl acetate and diethyl ether.

The results of pharmacological and clinical tests on the products of Examples 1 and 2 are summarised below.

The product of Example 2 was tested on guineapig auricles. The tests were carried out on two batches of organs, the product being left in contact with the organs for 5 minutes before washing. A slight negative chronotropic effect is observed starting from 10 μg/ml. At a dose of 100 μg/ml, the product of Example 2 exerts a more marked effect. The results are shown in Table I below.

TABLE I

|  | Dose μg/ml | Inotropic effect % change | Chronotropic effect % change |
| --- | --- | --- | --- |
| 1st series of experiments | 1 | 0 | 0 |
|  | 10 | −30 | −18 |
| 2nd series of experiments | 1 | +20 | 0 |
|  | 10 | +10 | −13 |
|  | 1000 | −50 | −50 |

Even at a dose of 100 μg/ml, the product of Example 2 does not block the stimulant effect of isoprenaline.

In the case of anaesthetised dogs, the product of Example 2 was injected intravenously into 2 dogs at increasing doses. An inotropic and negative chronotropic effect appears at 100 mg/kg. The results are shown in Table II below.

TABLE II

|  | Intravenous dose mg/kg | Arterial Pressure % change | F.C. % Change | Femoral flow rate % change | Observations |
| --- | --- | --- | --- | --- | --- |
| Batch 1 | 1 | +60 | 0 | 0 |  |
|  | 10 | 0 | 0 | 0 |  |
|  | 100 | −60 | −20 | −52 | Death of the animal, 1 hour after administration of 100 mg/kg |
| Batch 2 | 10 | 0 | 0 | 0 |  |
|  | 50 | −17 | −7 | −29 | Death of the animal, 2 hours 30 minutes after administration of 50 mg/kg |

The effect of isoprenaline is not markedly reduced even after 100 mg/kg.

In conclusion, the product of Example 2 exerts only a slight negative chronotropic effect on guineapig auricles and in anaesthetised dogs. It does not possess β-blocking properties.

In human therapy, this product has proved itself to be active in the treatment of cardiac arrhythmia.

Here are two observations by way of example.

M. R. . . — 90 years old — Myocardiac insufficiency — Cardiac insufficiency — Ventricular extrasystoles (5 every 50 cycles) — The product is administered in an amount of 0.30 g orally in a single dose. The extrasystoles decreased. New ingestion orally 8 hours later of a cachet containing 0.30 g of active principle. Complete disappearance of the extrasystoles. Slight bradycardia-producing effect.

M. G. . . — Extrasystolic ventricular polymorph. Product administered orally as gelatine-coated pills each containing 0.40 g of active ingredient. A favourable effect was noted 1 hour 30 minutes after the first administration. Over the course of 3 days a dose of 4 gelatine-coated pills of 0.15 g per day produced a favourable effect. Intravenous xylocaine at a dose of 1 g per day, administered first, did not remove the sporadic extrasystoles.

In the case of the product of Example 1, it was observed, using guineapig auricles, that, in contrast to propanolol which blocks the effects of isoprenaline at a dose of 0.1 γ/ml, there is no effect in this respect even at a dose of 40 γ/ml. Furthermore, the frequency of the coronary flow rate of the isolated heart is slightly increased.

In the case of humans, the product of Example 1 exerts an anti-arrhythmia effect when administered orally at a dose of 0.10 g to 0.30 g of active principle as a gelatine-coated pill or tablet, three or four times a day.

I claim:

1. A compound of the formula

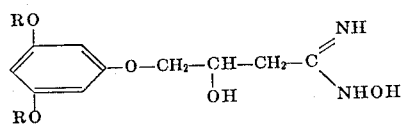

in which R represents hydrogen or alkyl of one to five carbon atoms or a salt thereof of a pharmaceutically acceptable acid.

2. A compound according to claim 1, in which the salt is a hydrochloride, hydrobromide, sulphate, phosphate, oxalate, fumarate, maleate, glutamate, cyclohexylsulphamate, aspartate, malate, benzoate, or ascorbate.

3. A compound according to claim 1, which is 4-(3,5-dimethoxy-phenoxy)-3-hydroxy-butyramidoxime or a salt thereof of a pharmaceutically acceptable acid.

* * * * *